(12) United States Patent
Damm et al.

(10) Patent No.: US 11,834,531 B2
(45) Date of Patent: Dec. 5, 2023

(54) SUSPENSION PROCESS FOR PREPARING ETHYLENE COPOLYMERS IN A REACTOR CASCADE

(71) Applicant: Basell Polyolefine GmbH, Wesseling (DE)

(72) Inventors: Elke Damm, Bad Vilbel (DE); Reinhard Kuehl, Bornheim (DE); Rodrigo Carvajal, Bonn (DE)

(73) Assignee: Basell Polyolefine GmbH, Wesseling (DE)

( * ) Notice: Subject to any disclaimer, the term of this patent is extended or adjusted under 35 U.S.C. 154(b) by 473 days.

(21) Appl. No.: 17/252,190

(22) PCT Filed: Jun. 19, 2019

(86) PCT No.: PCT/EP2019/066121
§ 371 (c)(1),
(2) Date: Dec. 14, 2020

(87) PCT Pub. No.: WO2019/243384
PCT Pub. Date: Dec. 26, 2019

(65) Prior Publication Data
US 2021/0198387 A1 Jul. 1, 2021

(30) Foreign Application Priority Data
Jun. 21, 2018 (EP) .................... 18179141

(51) Int. Cl.
*C08F 2/01* (2006.01)
*C08F 2/14* (2006.01)
(Continued)

(52) U.S. Cl.
CPC .............. *C08F 2/01* (2013.01); *C08F 2/001* (2013.01); *C08F 2/14* (2013.01); *C08F 2/18* (2013.01);
(Continued)

(58) Field of Classification Search
USPC ............................................. 526/65
See application file for complete search history.

(56) References Cited

U.S. PATENT DOCUMENTS

| 4,851,488 A * | 7/1989 | Burstain ................ C08F 10/00 526/78 |
| 6,204,345 B1 | 3/2001 | Berthold et al. |
| 2014/0171603 A1 | 6/2014 | Bhandarkar et al. |

FOREIGN PATENT DOCUMENTS

| EA | 005738 B1 | 2/2003 |
| EP | 905151 A1 | 3/1999 |

(Continued)

OTHER PUBLICATIONS

The International Search Report and The Written Opinion for PCT/EP2019/066121 dated Oct. 15, 2019.

(Continued)

*Primary Examiner* — Fred M Teskin

(57) ABSTRACT

A process for preparing a multimodal ethylene copolymer in suspension in a reactor cascade including a first polymerization reactor and subsequent polymerization reactor(s) including polymerizing ethylene and $C_3$-$C_{12}$-1-alkenes and forming a suspension of multimodal ethylene copolymer particles in a suspension medium made from or containing a diluent, transferring the suspension into a separator, wherein the suspension is separated into multimodal ethylene copolymer particles and recovered suspension medium, purifying part of the recovered suspension medium for producing purified components of the recovered suspension medium, and recycling part of the purified components of the recovered suspension medium to the first polymerization reactor of the reactor cascade, wherein the purified components of the recovered suspension medium recycled to the first polymerization reactor and made from or containing the (Continued)

diluent, undergo catalytic hydrogenation before being introduced into the first polymerization reactor.

15 Claims, 1 Drawing Sheet

(51) Int. Cl.
- *C08F 2/18* (2006.01)
- *C08F 6/24* (2006.01)
- *C08F 210/02* (2006.01)
- *C08F 210/14* (2006.01)
- *C08F 210/16* (2006.01)
- *C08F 2/00* (2006.01)
- *B01J 19/18* (2006.01)

(52) U.S. Cl.
CPC .............. *C08F 6/24* (2013.01); *C08F 210/02* (2013.01); *C08F 210/14* (2013.01); *C08F 210/16* (2013.01); *C08F 2500/05* (2013.01)

(56) References Cited

FOREIGN PATENT DOCUMENTS

| | | |
|---|---|---|
| EP | 905152 A1 | 3/1999 |
| EP | 1041090 A1 | 10/2000 |
| JP | S61133203 A | 6/1986 |
| JP | S61133204 A | 6/1986 |
| JP | H03031304 A | 2/1991 |
| JP | H11189605 A | 7/1999 |
| JP | 2001-200004 A | 7/2001 |
| JP | 2009-527615 A | 7/2009 |
| RU | 2629120 C2 | 8/2017 |
| WO | 2012028591 A1 | 3/2012 |
| WO | 2013154907 A2 | 10/2013 |
| WO | WO 2018/038796 A1 * 3/2018 ............ C08F 110/06 |

OTHER PUBLICATIONS

Alt et al., Bimodal Polyethylene-Interplay of Catalyst and Process, Macromol. Symp. 2001, 163, pp. 135-143.

* cited by examiner

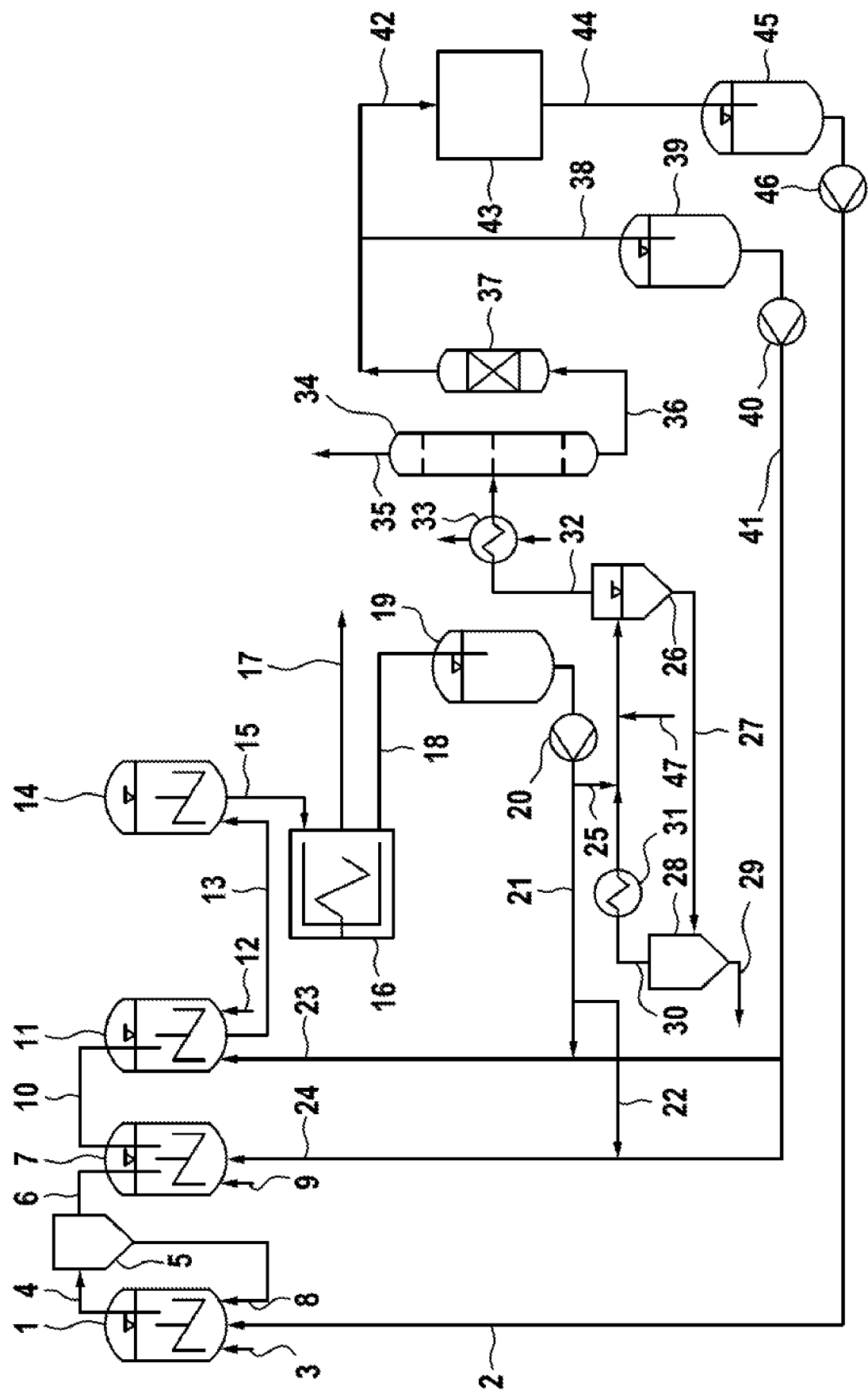

SUSPENSION PROCESS FOR PREPARING ETHYLENE COPOLYMERS IN A REACTOR CASCADE

This application is the U.S. National Phase of PCT International Application PCT/EP2019/066121, filed Jun. 19, 2019, claiming benefit of priority to European Patent Application No. 18179141.9, filed Jun. 21, 2018, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for preparing a multimodal ethylene copolymer in suspension in a reactor cascade.

BACKGROUND OF THE INVENTION

In some instances, processes for preparing ethylene copolymers in suspension in a reactor cascade are used for producing ethylene polymers. Different reaction conditions in the polymerization reactors produce different polymer compositions in the individual polymerization reactors. In some instances, the produced multimodal ethylene copolymers have good combinations of product properties and processability. Some suspension processes for preparing ethylene polymers employ a hydrocarbon or a hydrocarbon mixture as diluent. The suspension medium, which forms the liquid or supercritical phase of the suspension, further includes components like dissolved ethylene, comonomers, aluminum alkyls, and hydrogen and dissolved reaction products like oligomers and waxes.

The polymer properties of the produced ethylene copolymers depend on parameters such as the molecular weight distribution or the comonomer content and also on the incorporated comonomer. In some instances, increasing comonomer chain length increases product properties such as film performance or environmental stress crack resistance (ESCR). In some instances, ethylene copolymers having a relatively short chain comonomer such as ethylene/1-butene copolymers are used.

In some instances, non-reacted monomers, discharged from an ethylene polymerization reactor with the produced ethylene polymer, are recycled to the polymerization process. In some suspension polymerization processes, the other components of the suspension medium are recycled. In some instances and for producing multimodal ethylene copolymers, one of the polymerization reactors is an ethylene homopolymerization and has the related feed streams devoid of comonomers.

It is believed that separation by distillation of components of a liquid composition benefits from sufficient difference between the boiling points of the components. Accordingly and in some instances, technologies for preparing ethylene polymers in suspension employ specific combinations of comonomer and diluent.

SUMMARY OF THE INVENTION

In a general embodiment, the present disclosure provides a process for preparing a multimodal ethylene copolymer in suspension in a reactor cascade including a first polymerization reactor and one or more subsequent polymerization reactors including the steps of, polymerizing, in the reactor cascade, ethylene and one or more $C_3$-$C_{12}$-1-alkenes at temperatures of from 40 to 150° C. and pressures of from 0.1 to 20 MPa in the presence of a polymerization catalyst and forming a suspension of multimodal ethylene copolymer particles in a suspension medium made from or containing a diluent, transferring the suspension of multimodal ethylene copolymer particles into a separator, wherein the suspension is separated into multimodal ethylene copolymer particles and recovered suspension medium, purifying a first part of the recovered suspension medium in a purification section for producing purified components of the recovered suspension medium, and recycling a first part of the purified components of the recovered suspension medium to the first polymerization reactor of the reactor cascade, wherein the purified components of the recovered suspension medium recycled to the first polymerization reactor and are made from or containing the diluent, undergo a catalytic hydrogenation before being introduced into the first polymerization reactor.

In some embodiments, the purified components of the recovered suspension medium, which are recycled to the first polymerization reactor, amount to from 5 to 70 wt.-% of the recovered suspension medium.

In some embodiments, an ethylene homopolymer is prepared in the first polymerization reactor and a copolymer of ethylene is prepared in a subsequent polymerization reactor.

In some embodiments, the difference between the normal boiling point of one of the comonomers fed to the reactor cascade and the normal boiling point of the diluent is not more than 15° C. As used herein, the term "normal boiling points" refers to boiling points measured at 1013,25 hPa. In some embodiments, (a) the diluent is a mixture of components and (b) the difference between the normal boiling point of one of the comonomers fed to the reactor cascade and the initial normal boiling point or the final normal boiling point of the diluent is not more than 15° C.

In some embodiments, the multimodal ethylene copolymer is an ethylene-1-hexene copolymer.

In some embodiments, the multimodal ethylene copolymer is made from or containing at least two comonomers.

In some embodiments, the multimodal ethylene copolymer is made from or containing at least 1-hexene and 1-butene as comonomers.

In some embodiments, a second part of the recovered suspension medium is directly recycled to a subsequent polymerization reactor.

In some embodiments, the step for purifying a first part of the recovered suspension medium includes evaporating an additional part of the recovered suspension medium and then re-condensing the evaporated part of the suspension medium.

In some embodiments, the step for purifying a first part of the recovered suspension medium includes a distillation step.

In some embodiments, the purifying step for producing the purified components of the recovered suspension medium includes a step of wax removal.

In some embodiments, the suspension of polyethylene particles withdrawn from the first polymerization reactor of the reactor cascade is fed into a separator, wherein a part of the suspension medium is separated from the suspension and recycled to the first polymerization reactor of the reactor cascade and a concentrated suspension of polyethylene particles is transferred into the next polymerization reactor of the reactor cascade.

In some embodiments, the reactor cascade includes at least 3 polymerization reactors and the suspension of polyethylene particles withdrawn from the second polymerization reactor is fed into a separator, wherein a part of the suspension medium is separated from the suspension and recycled to the second polymerization reactor and a concentrated suspension of polyethylene particles is transferred into the third polymerization reactor.

In a general embodiment, the present disclosure provides an apparatus for polymerizing olefinic monomers in suspension in a reactor cascade including:
at least two serially connected polymerization reactors forming a reactor cascade,
a separator for separating the suspension in polyolefin particles and a recovered suspension medium,
transfer lines for transferring a suspension of polyolefin particles in a suspension medium from one polymerization reactor of the reactor cascade to the next polymerization reactor of the reactor cascade and from the last polymerization reactor of the reactor cascade to the separator, and
a recycle line for recycling parts of the recovered suspension medium to the first polymerization reactor of the reactor cascade,
wherein the recycle line for recycling parts of the recovered suspension medium to the first polymerization reactor of the reactor cascade is equipped with a catalytic hydrogenation unit.

In some embodiments of the apparatus, the transfer line for transferring the suspension of polyolefin particles from the first polymerization reactor of the reactor cascade to the next polymerization reactor of the reactor cascade is equipped with a separator for separating a part of the suspension medium from the suspension transferred from the first polymerization reactor of the reactor cascade to the next polymerization reactor of the reactor cascade and the apparatus further includes a recycle line for recycling the suspension medium separated from the suspension in the separator installed between the first polymerization reactor of the reactor cascade and the next polymerization reactor of the reactor cascade to the first polymerization reactor of the reactor cascade.

BRIEF DESCRIPTION OF THE DRAWINGS

The FIGURE is a schematic of a process for preparing a multimodal ethylene copolymers.

DETAILED DESCRIPTION OF THE INVENTION

In a general embodiment, the present disclosure provides a process for preparing a multimodal ethylene copolymer in suspension in a reactor cascade. As used herein, the term "multimodal" refers to the modality of an ethylene copolymer and indicates that the ethylene copolymer is made from or contains at least two fractions of polymer which are obtained under different reaction conditions, independently whether this modality is recognized as separated maxima in a gel permeation chromatography (GPC) curve or not. In some embodiments, different polymerization conditions are achieved by using different hydrogen concentrations or different comonomer concentrations in different polymerization reactors. As used herein, the term "multimodal" includes the term "bimodal".

In some embodiments, the ethylene copolymers are prepared by polymerizing ethylene and one or more $C_3$-$C_{12}$-1-alkenes in the presence of a polymerization catalyst. In some embodiments, the $C_3$-$C_{12}$-1-alkenes are linear or branched, alternatively linear $C_3$-$C_{10}$-1-alkenes, alternatively branched $C_2$-$C_{10}$-1-alkenes. In some embodiments, the linear $C_3$-$C_{10}$-1-alkenes are selected from the group consisting of propylene, 1-butene, 1-pentene, 1-hexene, 1-heptene, 1-octene, and 1-decene. In some embodiments, the branched $C_2$-$C_{10}$-1-alkenes are 4-methyl-1-pentene. In some embodiments, the ethylene is polymerized with mixtures of two or more $C_3$-$C_{12}$-1-alkenes. In some embodiments, comonomers are $C_3$-$C_8$-1-alkenes. In some embodiments, the $C_3$-$C_8$-1-alkenes are selected from the group consisting of 1-butene, 1-pentene, 1-hexene, 1-heptene and 1-octene. In some embodiments, the amount of units in the prepared multimodal ethylene copolymers which are derived from incorporated comonomers is from 0.01 wt. % to 25 wt. %, alternatively from 0.05 wt. % to 15 wt. %, alternatively from 0.1 wt. % to 12 wt. %. In some embodiments, ethylene is copolymerized with from 0.1 wt. % to 12 wt. % of 1-hexene and/or 1-butene. alternatively from 0.1 wt. % to 12 wt. % of 1-hexene.

In some embodiments, the multimodal ethylene copolymer is an ethylene-1-hexene copolymer, that is an ethylene copolymer which has been obtained by copolymerizing ethylene as main monomer and 1-hexene as comonomer.

In some embodiments, the multimodal ethylene copolymer is made from or contains at least two comonomers, that is, the multimodal ethylene copolymer is a terpolymer or a copolymer made from or containing more than two kinds of comonomers. In some embodiments, the ethylene copolymers are made from or contain at least 1-hexene and 1-butene as comonomers.

In some embodiments, the polymerization uses olefin polymerization catalysts. In some embodiments, the polymerization uses Phillips catalysts based on chromium oxide, titanium-based Ziegler- or Ziegler-Natta-catalysts, single-site catalysts, or mixtures of such catalysts. For the purposes of the present disclosure, single-site catalysts are catalysts based on chemically uniform transition metal coordination compounds. In some embodiments, the polymerization uses mixtures of two or more of these catalysts for the polymerization of olefins. As used herein, some of the mixed catalysts are designated as hybrid catalysts.

In some embodiments, the catalysts are of the Ziegler type. In some embodiments, the Ziegler-type catalysts are made from or contain a compound of titanium or vanadium, a compound of magnesium and optionally an electron donor compound and/or a particulate inorganic oxide as a support material.

In some embodiments, catalysts of the Ziegler type are polymerized in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, the cocatalysts are selected from the group consisting of organometallic alkyls, organometallic alkoxides, and organometallic halides.

In some embodiments, the organometallic compounds are selected from the group consisting of lithium alkyls, magnesium or zinc alkyls, magnesium alkyl halides, aluminum alkyls, silicon alkyls, silicon alkoxides and silicon alkyl halides. In some embodiments, the organometallic compounds are selected from the group consisting of aluminum alkyls and magnesium alkyls. In some embodiments, the organometallic compounds are aluminum alkyls, alternatively trialkylaluminum compounds or compounds wherein an alkyl group is replaced by a halogen atom. In some embodiments, the hydrogen atom is chlorine or bromine. In some embodiments, the aluminum alkyls are selected from the group consisting of trimethylaluminum, triethylaluminum, tri-isobutylaluminum, tri-n-hexylaluminum or diethylaluminum chloride or mixtures thereof.

In some embodiments, the process includes a polymerization which takes place in a medium, which is in liquid or in supercritical state under the conditions in the respective polymerization reactor and wherein the produced ethylene polymer is insoluble and forms solid particles. As used herein, the term "suspension medium" is alternatively used to denote the medium. In some embodiments, the solids content of the suspension is in the range of from 10 to 80 wt. %, alternatively from 20 to 40 wt. %.

In some embodiments, the suspension medium, which forms the liquid or supercritical phase of the suspension, is made from or contains, as main component, a diluent and further components selected from the group consisting of dissolved monomers or comonomers, dissolved cocatalysts or scavengers, dissolved reaction auxiliaries, and dissolved reaction products of the polymerization reaction. In some embodiments, the dissolved cocatalysts or scavengers are aluminum alkyls. In some embodiments, the dissolved reaction auxiliaries are hydrogen. In some embodiments, the dissolved reaction products of the polymerization reaction are oligomers or waxes. In some embodiments, the diluents are inert, that is, do not decompose under reaction conditions. In some embodiments, the diluents are hydrocarbons having from 3 to 12 carbon atoms. In some embodiments, the diluents are saturated hydrocarbons. In some embodiments, the saturated hydrocarbons are selected from the group consisting of isobutane, butane, propane, isopentane, pentane, hexane, octane, and a mixture of these. In some embodiments, the diluent is a hydrocarbon mixture. In some embodiments, hydrocarbon mixtures have a boiling point range.

In some embodiments, the boiling points of the diluent and one of the comonomers are close or overlap and the process is an ethylene homopolymerization carried out without separating the comonomer from the diluent.

In some embodiments, the difference between the normal boiling point of one of the comonomers fed to the reactor cascade and the normal boiling point of the diluent is not more than 15° C., alternatively not more than 10° C., alternatively not more than 6° C. In some embodiments, (a) the diluent is a mixture of components and (b) the difference between the normal boiling point of one of the comonomers fed to the reactor cascade and the initial normal boiling point or the final normal boiling point of the diluent is not more than 15° C., alternatively not more than 10° C., alternatively not more than 6° C.

In some embodiments, the process is carried out using suspension polymerization processes at temperatures in the range from 40 to 150° C., alternatively from 50 to 130° C., alternatively from 60 to 90° C., and under pressures of from 0.1 to 20 MPa, alternatively from 0.3 to 5 MPa.

In some embodiments, the process is carried out in a reactor cascade of at least two polymerization reactors which are connected in series. In some embodiments, the reactor cascade include a first polymerization reactor and one or more subsequent polymerization reactors. In some embodiments, these reactors are loop reactors or stirred tank reactors. In some embodiments, the process is carried out in a cascade of two reactors, a first polymerization reactor and a second polymerization reactor as a subsequent reactor. In some embodiments, the process includes two or more subsequent polymerization reactors arranged downstream of the first polymerization reactor. In some embodiments, different polymerization conditions are established in each of the polymerization reactors. In some embodiments, the reactor cascade includes one are more additional polymerization reactors. In some embodiments, the additional polymerization reactors are prepolymerization reactors upstream of the first polymerization reactor.

In some embodiments, ethylene homopolymer is prepared in the first polymerization reactor and a copolymer of ethylene is prepared in a subsequent polymerization reactor. In some embodiments, no comonomer is fed to the first polymerization reactor, neither directly nor as component of a feed stream or a recycle stream which is introduced into the first polymerization reactor of the reactor cascade. In some embodiments, the reactor cascade includes one are more prepolymerization reactors and the prepolymerization is carried without adding comonomers.

In some embodiments, the polymerization reactors are single reactors. In some embodiments, the first polymerization reactor has two or more reactors arranged in parallel or in series and operating under identical conditions.

In some embodiments, the multimodal ethylene copolymer is prepared in a cascade of a first reactor and one subsequent polymerization reactor, wherein the polyethylene prepared in the first polymerization reactor is an ethylene homopolymer and the polyethylene prepared in the subsequent polymerization reactor is an ethylene copolymer. In some embodiments, the ethylene homopolymer is a low molecular weight ethylene homopolymer. In some embodiments, the ethylene copolymer is a high molecular weight copolymer. In some embodiments, the multimodal ethylene copolymers is made from or contains from 35 to 65% by weight of ethylene homopolymer prepared in the first polymerization reactor and from 35 to 65% by weight of ethylene copolymer prepared in the subsequent polymerization reactor.

In some embodiments, the multimodal ethylene copolymer is prepared in a cascade of three polymerization reactors, that is, in a first polymerization reactor and two subsequent polymerization reactors, wherein the polyethylene prepared in the first polymerization reactor is an ethylene homopolymer, the polyethylene prepared in one of the subsequent polymerization reactors is an ethylene copolymer, and the polyethylene prepared in the other subsequent polymerization reactor is an ethylene copolymer of a higher molecular weight. In some embodiments, the ethylene homopolymer is a low molecular weight ethylene homopolymer. In some embodiments, the polyethylene prepared in one of the subsequent polymerization reactors is a high molecular weight copolymer. In some embodiments, the polyethylene prepared in the other subsequent polymerization reactor is an ultrahigh molecular weight copolymer. In some embodiments, the multimodal ethylene copolymers is made from or contains from 30 to 60% by weight, alternatively from 45 to 55% by weight, of ethylene homopolymer prepared in the first polymerization reactor, from 30 to 65% by weight, alternatively from 20 to 40% by weight, of ethylene copolymer prepared in one subsequent polymerization reactor, and from 1 to 30% by weight, alternatively from 15 to 30% by weight, of higher molecular weight ethylene copolymer prepared in the other subsequent polymerization reactor.

In the process, the suspension of multimodal ethylene copolymer particles formed in the reactor cascade is transferred into a separator, wherein the multimodal ethylene copolymer particles are separated from the suspension medium. In some embodiments, this separation into multimodal ethylene copolymer particles and recovered suspension medium is carried out in centrifuges, decanters, filters or combinations thereof. In some embodiments, the separator is a centrifuge. In some embodiments, the suspension withdrawn from the reactor cascade is first transferred into a separator feed vessel and conveyed from the separator feed vessel to the separator.

In some embodiments, the recovered suspension medium is made from or contains more than 80 wt. % of diluent. Further components of the recovered suspension medium are ethylene, comonomers, aluminum alkyls, and hydrogen and dissolved reaction products like oligomers and waxes.

In some embodiments, a major portion of the recovered suspension medium is recycled to the reactor cascade. In some embodiments, the polymerization reactors of the reactor cascade are provided with recycled parts of the recovered suspension medium. In some embodiments, from 90 to 99.99 wt.-%, alternatively from 95 to 99.5 wt.-%, alternatively from 98 to 99 wt.-%, of the recovered suspension medium is recycled to the reactor cascade. In some embodiments, the parts of the recovered suspension medium which are not recycled to the reactor cascade include continuous flushings of pumps, off-gas which is vented to purge gaseous impurities of the feed streams or gaseous by-products of the polymerization process or dissolved reaction products. In some embodiments, the dissolved reaction products are waxes intentionally removed from the recovered suspension medium.

In some embodiments, the recovered suspension medium is first fed to a suspension medium collecting vessel and, for being recycled to the polymerization reactors of the reactor cascade, the recovered suspension medium is withdrawn from the suspension medium collecting vessel.

In some embodiments, the multimodal ethylene copolymer particles obtained in the separator are still wet. In some embodiments, the multimodal ethylene copolymer particles have a content of suspension medium in the range from 15 wt.-% to 40 wt.-%, alternatively from 20 wt.-% to 35 wt.-%. In some embodiments, the separated multimodal ethylene copolymer particles are fed to a two-stage drying section wherein residual suspension medium is stripped from the multimodal ethylene copolymer particles with hot nitrogen in closed loops. In some embodiments, the dried multimodal ethylene copolymer particles are pneumatically conveyed to an extrusion section wherein additives are added and the mixture is molten, homogenized and pelletized. In some embodiments, a major portion of the components of the suspension medium which are separated from the multimodal ethylene copolymer particles in the drying process are collected and recycled to the reactor cascade.

In the process, a part of the recovered suspension medium is purified in a purification section for producing purified components of the recovered suspension medium. As used herein, the term "purification" refers to a composition separated in one or more separated compositions or that one or more components of a composition are removed from the composition and a purified composition void of the removed component(s) is obtained. In some embodiments, the purification isolates individual components of the composition. In some embodiments, a purification process includes removing components of the recovered suspension medium, which have lower boiling point than the diluent, from the recovered suspension medium, or removing components of the suspension medium, which have higher boiling point than the diluent, from the recovered suspension medium. In some embodiments, the components for removal are oligomers or waxes. In some embodiments, the amount of recovered suspension medium which passes the purification section is from 1 to 90 wt.-%, alternatively from 5 to 80 wt.-% of the recovered suspension medium recycled to the reactor cascade. In some embodiments, the recovered suspension medium is separated in two or more components which are recycled to the reactor cascade in individual recycle circuits. In some embodiments and after the separation, each of the individual recycle circuits includes further purification steps. In some embodiments, components of the recovered suspension medium are recycled to the reactor cascade in individual recycle circuits and are made from or containing the diluent, ethylene and comonomers. In some embodiments, the purified components of the recovered suspension medium is transferred to any of the reactors of the reactor cascade.

In some embodiments, the process for producing the purified components of the recovered suspension medium includes a step of evaporating a part of the recovered suspension medium and then re-condensing the evaporated part of the suspension medium. In some embodiments, the evaporated part of the recovered suspension medium is made from or contains ethylene, hydrogen, those comonomers, which have a lower or a similar boiling point than the used diluent, and parts of the diluent. In some embodiments, n-hexane or a mixture of hexane isomers is used as the diluent, 1-butene is used as a comonomer, the recovered suspension medium is made from or contains the 1-butene, and a major portion of the 1-butene therein forms a part of the evaporated part of the suspension medium. In some embodiments, a major portion of the evaporated part of the recovered suspension medium is recycled to one or more of the polymerization reactors in individual recycle circuits. In some embodiments, the evaporated part of the recovered suspension is recycled to the polymerization reactors after having passed one or more further purification steps.

In some embodiments, the process for producing the purified components of the recovered suspension medium includes a distillation step. In some embodiments, the lower boiling point component obtained by the distillation is made from or contains ethylene, hydrogen, those comonomers, which have a lower or a similar boiling point than the used diluent, and parts of the diluent. In some embodiments, n-hexane or a mixture of hexane isomers is used as the diluent, 1-butene is used as a comonomer, the recovered suspension medium is made from or contains the 1-butene, and a major portion of the 1-butene therein forms a part of the lower boiling point component obtained by the distillation. In some embodiments, a major portion of the lower boiling point component obtained by the distillation is recycled to one or more of the polymerization reactors in individual recycle circuits. In some embodiments, the evaporated part of the recovered suspension is recycled to the polymerization reactors after having passed one or more further purification steps.

In some embodiments, the higher boiling point component obtained by the distillation is made from or contains a major portion of the diluent and those comonomers, which have a boiling point similar to or higher than that of the used diluent. In some embodiments, a major portion of the higher boiling point component obtained by the distillation is recycled to one or more of the polymerizations reactors. In some embodiments, a major portion of the higher boiling point component obtained by the distillation is recycled to one or more of the polymerizations reactors after having passed one or more further purification steps.

In some embodiments, the process for producing the purified components of the recovered suspension medium in the purification section includes a step of wax removal. In some embodiments, wax withdrawn from the polymerization process is combusted for generating energy or isolated as a by-product of the polymerization process.

In some embodiments, the process for producing the purified components of the recovered suspension medium includes additional purification steps. In some embodiments, the additional purification steps are selected from the group consisting of a purification by adsorption, a purification by absorption, and a purification by a membrane purification process.

In some embodiments, at least some or a part of the purified components of the recovered suspension medium is recycled to the first polymerization reactor of the reactor cascade. In some embodiments, components of the recovered suspension medium are diluent and ethylene.

In some embodiments, the components of the recovered suspension medium are recycled to the first polymerization reactor of the reactor cascade. In some embodiments, these components are recycled in individual recycle circuits.

In some embodiments, from 5 to 70 wt.-% of the recovered suspension medium are recycled as purified components of the recovered suspension medium to the first polymerization reactor of the reactor cascade, alternatively from 10 to 60 wt.-%, alternatively from 15 to 50 wt.-%.

In some embodiments, the purified components of the recovered suspension medium recycled to the first polymerization reactor undergo a catalytic hydrogenation before being introduced into the first polymerization reactor. The purified components of the recovered suspension medium recycled to the first polymerization reactor is made from or contains the diluent. As used herein, the term "catalytic hydrogenation" refers to a chemical reaction wherein unsaturated chemical compound are reacted with hydrogen in the presence of a hydrogenation catalyst. In some embodiments, the suspension medium to be recycled to the first polymerization reactor is made from or contains unsaturated chemical compounds. In some embodiments, the unsaturated chemical compounds are various chemical compounds which are introduced into the reactor cascade as impurities of the feed streams or which have been formed in side reactions of the polymerization process. In some embodiments, the major parts of the unsaturated chemical compounds, which are hydrogenated, are remaining ethylene and, predominantly, the comonomer or the comonomers.

In some embodiments, the catalytic hydrogenation is carried out in liquid phase or in gas-phase. In some embodiments, the catalytic hydrogenation is performed in liquid phase.

In some embodiments, the hydrogenation catalysts are catalysts based on platinum, palladium, rhodium or other transition metals. In some embodiments, the transition metals are selected from the group consisting of molybdenum, tungsten, chromium, iron, cobalt, copper and nickel. In some embodiments, the hydrogenation catalysts are individually or in a mixture. In some embodiments, the hydrogenation catalysts are applied to supports such as activated carbon, ceramics, etc. In some embodiments, the hydrogenation is carried out at from 50 to 300° C., alternatively from 100 to 250° C.

In some embodiments, the hydrogenation catalysts for hydrogenations in the gas phase are platinum- or palladium-based compositions, alternatively platinum or palladium on alumina. In some embodiments, the hydrogenation catalysts for hydrogenations in the liquid phase are cobalt- or nickel-based catalysts activated by trialkylaluminums, rhodium catalysts, or ruthenium catalysts. In some embodiments, the cobalt- or nickel-based catalysts activated by trialkylaluminums are cobalt(acetylacetonate) or nickel(octanoate). In some embodiments, the rhodium catalyst is Wilkinson's catalyst (Rh(PPh$_3$)$_3$Cl). In some embodiments, the ruthenium catalyst is Ru(H)Cl(PPh$_3$)$_3$. In some embodiments, heterogeneous platinum, platinum oxide or palladium catalysts are used as a suspension in the reaction medium. In some embodiments, other hydrogenation catalysts are as described in "Catalytic Hydrogenation" (R. L. Augustine, publisher Dekker, N.Y., 1965) and in "Advanced Organic Chemistry", 4 th Edition, p. 771-780 (J. March, publisher Wiley, N.Y., 1992).

In some embodiments, a part of the recovered suspension medium is directly recycled to a subsequent polymerization reactor. In some embodiments, the subsequent polymerization reactors of the reactor cascade are provided with directly recycled parts of the recovered suspension medium. In some embodiments, parts of the recovered suspension medium are recycled to the second and the optional further subsequent polymerization reactors made from or containing the diluent, non-reacted ethylene and comonomers, cocatalysts or scavengers, dissolved reaction auxiliaries and dissolved reaction products of the polymerization reaction. In some embodiments, the cocatalysts or scavengers are aluminum alkyls. In some embodiments, the dissolved reaction auxiliaries are hydrogen. In some embodiments, the dissolved reaction products of the polymerization reaction are oligomers or waxes. In some embodiments, from 10 to 99 wt.-%, alternatively from 20 to 95 wt.-%, of the recovered suspension medium are directly recycled to the reactor cascade.

In some embodiments, fresh diluent which is introduced into the reactor cascade for replacing losses of diluent is not directly fed into one of the polymerization reactors but fed into a component of the purification section or added to the part of the recovered suspension medium which is transferred into the purification section.

In some embodiments, the suspension of polyethylene particles withdrawn from the first polymerization reactor of the reactor cascade is fed into a separator, wherein a part of the suspension medium is separated from the suspension and recycled to the first polymerization reactor of the reactor cascade and a concentrated suspension of polyethylene particles is transferred into the next polymerization reactor of the reactor cascade. In some embodiments, separators for separating a part of the suspension medium from the suspension withdrawn from the first polymerization reactor are centrifuges, filters, cyclones, concentrators (thickeners) or combinations thereof.

In some embodiments, the reactor cascade includes at least three polymerization reactors, the suspension transferred from the first polymerization reactor to the second polymerization reactor passes a separator, and the suspension transferred from the second polymerization reactor to the third polymerization reactor passes a separator. In some embodiments, different comonomers are used in the second and the third polymerization reactor. In some embodiments, comonomer mixtures of a different composition are used in the second and the third polymerization reactor. In some embodiments, 1-butene as comonomer is used primarily in the second polymerization reactor and 1-hexene as comonomer is used primarily in the third polymerization reactor, or vice versa.

The FIGURE is a schematic of a process for preparing a multimodal ethylene copolymers wherein the polymerization takes place in a cascade of three reactors.

For polymerizing the olefins in a first polymerization reactor (1) in suspension, recycled purified components of a recovered suspension medium are fed to the reactor (1) via feeding line (2). The other components of the reaction mixture like catalyst, ethylene, possible comonomers and polymerization auxiliaries are fed to the reactor via one or more feeding lines (3). As result of the polymerization in reactor (1), a suspension of solid polyethylene particles in a suspension medium is formed. This suspension is fed via line (4) to a separator (5) wherein the suspension formed in reactor (1) is separated into a concentrated suspension, which is transferred via line (6) into a second polymerization reactor (7), and a liquid suspension medium which is recycled to the first polymerization reactor (1) via line (8).

Within polymerization reactor (7), further polymerization occurs. Directly recycled recovered suspension medium is fed to reactor (7) via lines (21), (22) and (24). In some instances, recycled purified components of the recovered suspension medium are fed to reactor (7) via lines (41) and (24). In some instances, fresh ethylene, comonomer or further components of the reaction mixture are fed to reactor (7) via one or more feeding lines (9). The suspension of reactor (7) is thereafter fed via line (10) to a third polymerization reactor (11) wherein additional polymerization is carried out. Directly recycled recovered suspension medium is fed to reactor (11) via lines (21) and (23). In some instances, recycled purified components of the recovered suspension medium are fed to reactor (11) via lines (41) and (22). One or more feeding lines (12) allow supplementary feeding of ethylene, comonomer or further components of the reaction mixture to reactor (11).

The suspension of solid multimodal ethylene copolymer particles formed in reactor (11) is continuously transferred via line (13) to a separator feed vessel (14). The suspension is then passed via line (15) to centrifuge (16), where suspension is separated in solid multimodal ethylene copolymer particles and recovered liquid suspension medium. The isolated multimodal ethylene copolymer particles are conducted via line (17) to a dryer (not shown) and thereafter to a pelletizing unit (not shown).

The recovered suspension medium is transferred via line (18) to a suspension medium collecting vessel (19). From there and in some instances, the recovered suspension medium is recycled by pump (20) via lines (21) and (22) and lines (23) and (24) to polymerization reactor (7) and/or polymerization reactor (11).

A part of the recovered suspension medium is branched off line (21) and transferred via line (25) to a purification section including an evaporator (26), a distillation column (34), and an adsorber unit (37). The recovered suspension medium branched off through line (21) is conveyed into evaporator (26). Higher boiling point fractions of the recovered suspension medium are withdrawn from the bottom of evaporator (26) via line (27) and transferred to a wax separator vessel (28). Liquid wax is withdrawn from the bottom of wax separator vessel (28) via line (29) and conveyed to an incineration unit (not shown). In some, the liquid wax is used for generation of steam. In some instances, the liquid wax is conveyed to a solidifying unit (not shown) for collection. A gaseous fraction is withdrawn from the top of wax separator vessel (28) via line (30), passed through heat exchanger (31) for being condensed and send via line (25) to back to evaporator (26).

The fractions of the recovered suspension medium evaporated in evaporator (26) are withdrawn from the top of evaporator (26) via line (32), passed through heat exchanger (33) for condensing and transferred into a distillation column (34). Low boiling point components are withdrawn from the top of distillation column (34) via line (35). When operating the polymerization in reactors (1), (7) and (11) with 1-butene as comonomer, 1-butene is withdrawn via line (35) and transferred into a 1-butene recovery unit (not shown) for purifying the 1-butene and recycling the 1-butene to one or more of the polymerization reactors of the reactor cascade.

The bottom stream of distillation column (34) is transferred via line (36) to an adsorber unit (37) to remove polar impurities. After having passed the adsorber unit (37), the part of the bottom stream to be recycled to the polymerization reactors (7) and (11) is transferred via line (38) to a bottom stream collecting vessel (39). From there, the bottom stream is recycled by pump (40) via line (41) and lines (23) and (24) to polymerization reactor (7) and/or polymerization reactor (11).

The part of the bottom stream to be recycled to the first polymerization reactor (1), is transferred, after having passed the adsorber unit (37), via line (42) to a catalytic hydrogenation unit (43). The hydrogenated bottom stream is transferred via line (44) to a hydrogenated bottom stream collecting vessel (45). From there, the hydrogenated bottom stream is recycled by pump (46) via line (2) to the first polymerization reactor (1).

For replacing losses of diluent, fresh diluent is fed to the purification section via line (47). In some instances, the loss of diluent results from discharging diluent together with the multimodal ethylene copolymer particles and not fully recovering the diluent in the drying process of the multimodal ethylene copolymer particles.

In some embodiments, the disclosure further provides an apparatus for polymerizing olefinic monomers in suspension in a reactor cascade including:

at least two serially connected polymerization reactors forming a reactor cascade, a separator for separating the suspension in polyolefin particles and a recovered suspension medium, transfer lines for transferring a suspension of polyolefin particles in a suspension medium from one polymerization reactor of the reactor cascade to the next polymerization reactor of the reactor cascade and from the last polymerization reactor of the reactor cascade to the separator, and a recycle line for recycling parts of the recovered suspension medium to the first polymerization reactor of the reactor cascade, wherein the recycle line for recycling parts of the recovered suspension medium to the first polymerization reactor of the reactor cascade is equipped with a catalytic hydrogenation unit.

In some embodiments, the transfer line for transferring the suspension of polyolefin particles from the first polymerization reactor of the reactor cascade to the next polymerization reactor of the reactor cascade is equipped with a separator for separating a part of the suspension medium from the suspension transferred from the first polymerization reactor of the reactor cascade to the next polymerization reactor of the reactor cascade and the apparatus further includes a recycle line for recycling the suspension medium separated from the suspension in the separator installed between the first polymerization reactor of the reactor cascade and the next polymerization reactor of the reactor cascade to the first polymerization reactor of the reactor cascade.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A process for preparing a multimodal ethylene copolymer in suspension in a reactor cascade comprising a first polymerization reactor and one or more subsequent polymerization reactors comprising the steps of:
    polymerizing, in the reactor cascade, ethylene and one or more $C_3$-$C_{12}$-1-alkenes at temperatures of from 40 to 150° C. and pressures of from 0.1 to 20 MPa in the presence of a polymerization catalyst and forming a suspension of multimodal ethylene copolymer particles in a suspension medium comprising a diluent,
    transferring the suspension of multimodal ethylene copolymer particles into a separator, wherein the suspension is separated into multimodal ethylene copolymer particles and recovered suspension medium,
    purifying a first part of the recovered suspension medium in a purification section for producing purified components of the recovered suspension medium, and
    recycling a first part of the purified components of the recovered suspension medium to the first polymerization reactor of the reactor cascade,
    wherein the purified components of the recovered suspension medium recycled to the first polymerization reactor and comprise the diluent, undergo a catalytic hydrogenation before being introduced into the first polymerization reactor.

2. The process of claim 1, wherein the purified components of the recovered suspension medium, which are recycled to the first polymerization reactor, amount to from 5 to 70 wt. % of the recovered suspension medium.

3. The process of claim 1, wherein an ethylene homopolymer is prepared in the first polymerization reactor and a copolymer of ethylene is prepared in a subsequent polymerization reactor.

4. The process of claim 1, wherein the difference between the normal boiling point of one of the comonomers fed to the reactor cascade and the normal boiling point of the diluent is not more than 15° C. and wherein the normal boiling points are defined as boiling points measured at 1013.25 hPa.

5. The process of claim 1, wherein the multimodal ethylene copolymer is an ethylene-1-hexene copolymer.

6. The process of claim 1, wherein the multimodal ethylene copolymer comprises at least two comonomers.

7. The process of claim 6, wherein the multimodal ethylene copolymer comprises at least 1-hexene and 1-butene as comonomers.

8. The process of claim 1, wherein a second part of the recovered suspension medium is directly recycled to a subsequent polymerization reactor.

9. The process of claim 1, wherein step for purifying a first part of the recovered suspension medium includes evaporating an additional part of the recovered suspension medium and then re-condensing the evaporated part of the suspension medium.

10. The process of claim 1, wherein the step for purifying a first part of the recovered suspension medium includes a distillation step.

11. The process of claim 1, wherein the purifying step for producing the purified components of the recovered suspension medium includes a step of wax removal.

12. The process of claim 1, wherein the suspension of polyethylene particles withdrawn from the first polymerization reactor of the reactor cascade is fed into a separator, wherein a part of the suspension medium is separated from the suspension and recycled to the first polymerization reactor of the reactor cascade and a concentrated suspension of polyethylene particles is transferred into the next polymerization reactor of the reactor cascade.

13. The process of claim 1, wherein the reactor cascade comprises at least 3 polymerization reactors and the suspension of polyethylene particles withdrawn from the second polymerization reactor is fed into a separator, wherein a part of the suspension medium is separated from the suspension and recycled to the second polymerization reactor and a concentrated suspension of polyethylene particles is transferred into the third polymerization reactor.

14. The process of claim 1, wherein (a) the diluent is a mixture of components and (b) the difference between the normal boiling point of one of the comonomers fed to the reactor cascade and the initial normal boiling point or the final normal boiling point of the diluent is not more than 15° C. and wherein the normal boiling points being defined as boiling points measured at 1013.25 hPa.

15. An apparatus for polymerizing olefinic monomers in suspension in a reactor cascade comprising:
    at least two serially connected polymerization reactors forming a reactor cascade,
    a separator for separating the suspension into polyolefin particles and a recovered suspension medium,
    transfer lines for transferring a suspension of polyolefin particles in a suspension medium from one polymerization reactor of the reactor cascade to the next polymerization reactor of the reactor cascade and from the last polymerization reactor of the reactor cascade to the separator, and
    a recycle line for recycling parts of the recovered suspension medium to the first polymerization reactor of the reactor cascade,
    wherein the recycle line for recycling parts of the recovered suspension medium to the first polymerization reactor of the reactor cascade is equipped with a catalytic hydrogenation unit,
    wherein the transfer line for transferring the suspension of polyolefin particles from the first polymerization reactor of the reactor cascade to the next polymerization reactor of the reactor cascade is equipped with a separator for separating a part of the suspension medium from the suspension transferred from the first polymerization reactor of the reactor cascade to the next polymerization reactor of the reactor cascade and the apparatus further comprises a recycle line for recycling the suspension medium separated from the suspension in the separator installed between the first polymerization reactor of the reactor cascade and the next polymerization reactor of the reactor cascade to the first polymerization reactor of the reactor cascade.

\* \* \* \* \*